United States Patent
Zhao

(10) Patent No.: US 8,854,031 B2
(45) Date of Patent: Oct. 7, 2014

(54) CLOCK-DETECTING CIRCUIT

(75) Inventor: Yong Zhao, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 825 days.

(21) Appl. No.: 12/726,517

(22) Filed: Mar. 18, 2010

(65) Prior Publication Data

US 2010/0283510 A1 Nov. 11, 2010

(30) Foreign Application Priority Data

May 11, 2009 (CN) .................. 2009 2 0056764 U

(51) Int. Cl.
*G06M 1/10* (2006.01)
*H02M 1/08* (2006.01)

(52) U.S. Cl.
CPC .................. *H02M 1/083* (2013.01)
USPC .................................. 324/76.62

(58) Field of Classification Search
CPC .............. G01R 19/175; H02M 1/083
USPC .......... 324/76.48, 727, 76.62; 331/44, 64
See application file for complete search history.

(56) References Cited

U.S. PATENT DOCUMENTS

| | | | | | |
|---|---|---|---|---|---|
| 3,829,962 | A | * | 8/1974 | Simonelic | 29/593 |
| 3,975,678 | A | * | 8/1976 | Erickson | 324/727 |
| 4,255,789 | A | * | 3/1981 | Hartford et al. | 701/108 |
| 4,779,013 | A | * | 10/1988 | Tanaka | 326/27 |
| 4,809,280 | A | * | 2/1989 | Shonaka | 714/55 |
| 5,128,909 | A | * | 7/1992 | Stein | 368/200 |
| 5,619,643 | A | * | 4/1997 | Moroni et al. | 714/23 |
| 5,742,379 | A | * | 4/1998 | Reifer | 356/5.07 |
| 5,809,336 | A | * | 9/1998 | Moore et al. | 710/25 |
| 5,821,642 | A | * | 10/1998 | Nishhira et al. | 307/127 |
| 5,903,747 | A | * | 5/1999 | Casal | 713/501 |
| 6,204,623 | B1 | * | 3/2001 | Levy et al. | 318/641 |
| 6,343,741 | B1 | * | 2/2002 | Arends et al. | 235/462.25 |
| 6,590,376 | B1 | * | 7/2003 | Bammert et al. | 324/76.41 |
| 6,717,394 | B2 | * | 4/2004 | Elms | 324/76.39 |
| 2004/0085108 | A1 | * | 5/2004 | Murata et al. | 327/158 |
| 2004/0093508 | A1 | * | 5/2004 | Foerstner et al. | 713/200 |
| 2004/0193884 | A1 | * | 9/2004 | Molaro et al. | 713/175 |
| 2005/0059368 | A1 | * | 3/2005 | Saito et al. | 455/150.1 |
| 2005/0094745 | A1 | * | 5/2005 | Miyanaga et al. | 375/320 |
| 2006/0132103 | A1 | * | 6/2006 | Baratto et al. | 322/17 |
| 2007/0093928 | A1 | * | 4/2007 | Forster et al. | 700/168 |
| 2009/0281757 | A1 | * | 11/2009 | Mohebbi et al. | 702/117 |
| 2010/0171528 | A1 | * | 7/2010 | Guillot et al. | 327/20 |

* cited by examiner

*Primary Examiner* — Patrick Assouad
*Assistant Examiner* — Demetrius Pretlow
(74) *Attorney, Agent, or Firm* — Matthias Scholl P.C.; Matthias Scholl

(57) ABSTRACT

A clock-detecting circuit, containing at least a microprocessor, a clock circuit, and a zero-cross detecting circuit. The clock circuit is connected to the microprocessor. The input end of the zero-cross detecting circuit is connected to the utility power AC input. The output end of the zero-cross detecting circuit is connected to the input end of the microprocessor. The zero-cross detecting circuit operates to detect zero crossing points of the utility power AC input. The microprocessor operates to count the number of oscillation periods of the clock circuit in a time interval between two adjacent zero crossing points of the utility power AC input and to detect clock precision of the microprocessor according to the counted number. The circuit according to the invention features simple structure and low production cost, and is reliable and easy to be implemented.

9 Claims, 2 Drawing Sheets

CLOCK-DETECTING CIRCUIT

CROSS-REFERENCE TO RELATED APPLICATIONS

Pursuant to 35 U.S.C. §119 and the Paris Convention Treaty, this application claims the benefit of Chinese Patent Application No. 200920056764.7 filed on May 11, 2009, the contents of which are incorporated herein by reference.

BACKGROUND OF THE INVENTION

1. Field of the Invention

The invention relates to a detecting circuit, and more particularly to a clock detecting circuit.

2. Description of the Related Art

Nowadays, brushless DC motors are widely used. A typical problem with a controller of a conventional brushless DC motor is that clock precision of a microprocessor thereof is not high enough, which affects normal control and operation efficiency thereof, increases power consumption, or even leads to a destruction of the controller and the motor.

To solve the above-mentioned problems, several methods are employed: clock circuits with high precision are used, and special watchdog chips are used to detect clock precision of the microprocessors. However, these methods have several disadvantages: firstly, structure of the circuit using the methods is complex, secondly, production cost thereof is very high, and thus application of the brushless DC motor is limited.

SUMMARY OF THE INVENTION

In view of the above-described problem, it is one objective of the invention to provide a clock detecting circuit that features simple structure and low production cost, and is reliable and easy to be implemented.

To achieve the above objectives, in accordance with one embodiment of the invention, provided is a clock detecting circuit, comprising a microprocessor, a clock circuit, and a zero-cross detecting circuit. The clock circuit is connected to the microprocessor, an input end of the zero-cross detecting circuit is connected to a utility power AC input, an output end of the zero-cross detecting circuit is connected to an input end of the microprocessor, the zero-cross detecting circuit operates to detect zero crossing points of the utility power AC input, the microprocessor operates to count the number of oscillation periods of the clock circuit in a time interval between two adjacent zero crossing points of the utility power AC input, and to detect clock precision of the microprocessor according to the counted number.

In a class of this embodiment, the clock circuit is a crystal oscillating circuit.

In a class of this embodiment, the clock circuit is an oscillating circuit.

In a class of this embodiment, the microprocessor compares the counted number with a minimum threshold value and a maximum threshold value whereby determining whether the clock precision of the microprocessor meets a precision requirement.

In a class of this embodiment, the microprocessor is a micro controller unit.

In a class of this embodiment, the microprocessor is a digital signal processor.

In a class of this embodiment, it further comprises a rectifying and voltage-stabilizing circuit.

In a class of this embodiment, an input end of the rectifying and voltage-stabilizing circuit is connected to the utility power AC input.

In a class of this embodiment, an output end of the rectifying and voltage-stabilizing circuit operates to supply power to the zero-cross detecting circuit.

Advantages of the invention comprise: no special watchdog chip is needed to detect clock precision of the microprocessor, and thus circuit structure is simple, production cost is reduced, and the invention is reliable and easy to be implemented.

BRIEF DESCRIPTION OF THE DRAWINGS

Detailed description will be given below in conjunction with accompanying drawings, in which.

DETAILED DESCRIPTION OF THE EMBODIMENTS

Figure 1:
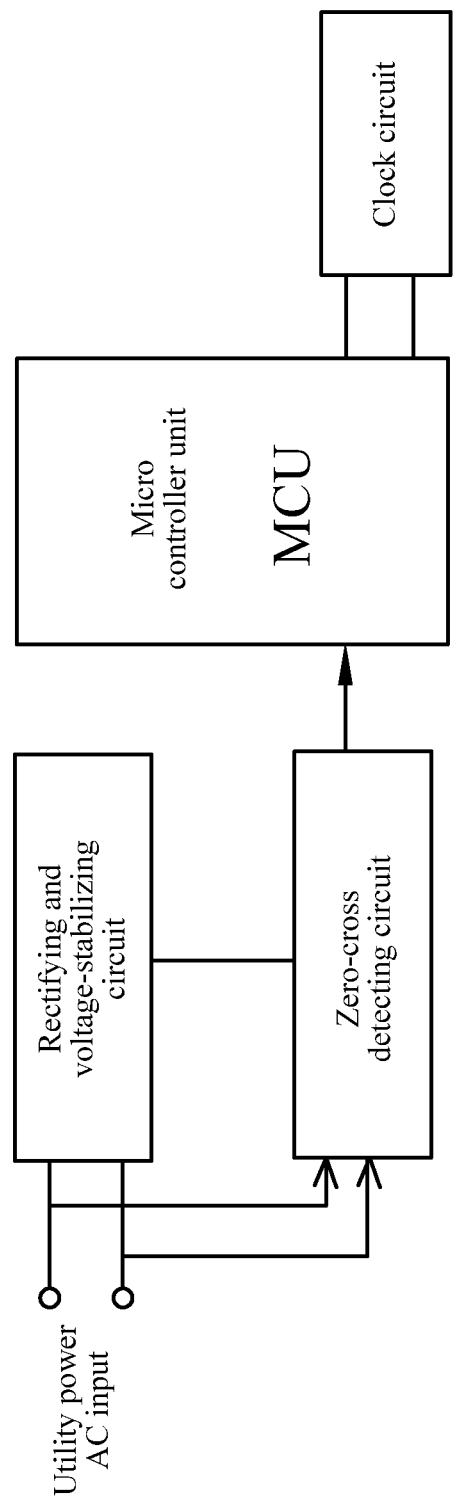
FIG. 1 is a block diagram of a clock detecting circuit of an embodiment of the invention.
Figure 2:
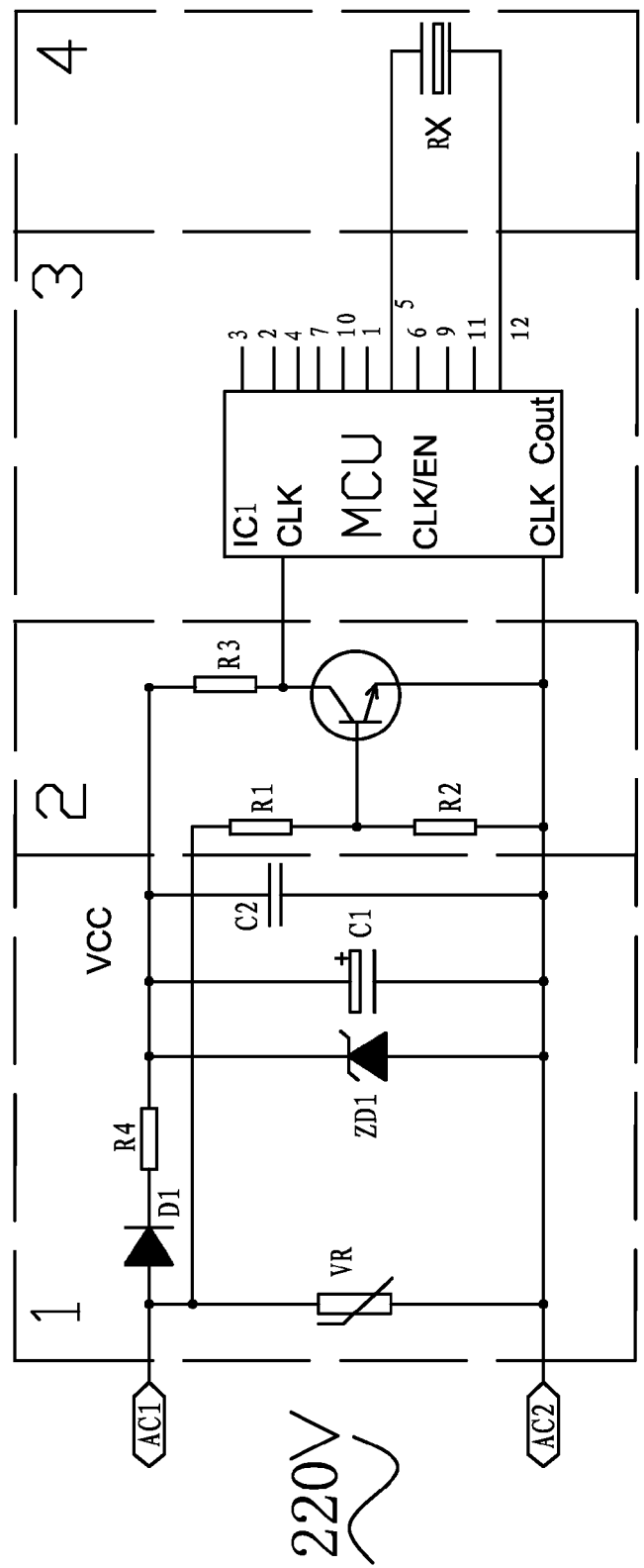
FIG. 2 is a schematic diagram of a clock detecting circuit of an embodiment of the invention.

As shown in FIGS. 1 and 2, a clock detecting circuit of the invention comprises a zero-cross detecting circuit 2, a microprocessor 3, a clock circuit 4, and a rectifying and voltage-stabilizing circuit 1.

An input end of the rectifying and voltage-stabilizing circuit 1 is connected to the utility power AC input, and an output end of the rectifying and voltage-stabilizing circuit 1 operates to supply power to the zero-cross detecting circuit 2.

An input end of the zero-cross detecting circuit 2 is connected to a utility power AC input, and an output end of the zero-cross detecting circuit 2 is connected to an input end of the microprocessor 3.

The zero-cross detecting circuit 2 operates to detect zero crossing points of the utility power AC input.

The microprocessor 3 operates to count the number of oscillation periods of the clock circuit 4 in a time interval between two adjacent zero crossing points of the utility power AC input, and to detect clock precision of the microprocessor 3 according to the counted number. In this embodiment, the microprocessor 3 is a micro controller unit or a digital signal processor.

The clock circuit 4 is connected to the microprocessor 3. In this embodiment, the clock circuit 4 is a crystal oscillating circuit or an oscillating circuit.

As shown in FIG. 2, the clock circuit 4 is a crystal oscillating circuit RX.

A method of using the clock detecting circuit of the invention comprises: firstly the zero-cross detecting circuit 2 detects zero crossing points of the utility power AC input, then the microprocessor 3 counts the number M of oscillation periods of the clock circuit 4 in a time interval between two adjacent zero crossing points of the utility power AC input, finally the microprocessor 3 compares the counted number with a minimum threshold value M0 and a maximum threshold value M1 whereby determining whether the clock precision of the microprocessor 3 meets a precision requirement. If M1>M>M0, the clock precision of the microprocessor 3 meets the precision requirement. If M<M0 or M>M1, the clock precision of the microprocessor 3 does not meet the precision requirement.

Operation of the clock detecting circuit of the invention is as follows: the rectifying and voltage-stabilizing circuit 1 supplies low-voltage DC power to the zero-cross detecting circuit 2, the zero-cross detecting circuit 2 detects zero crossing points of the utility power AC input, then the microprocessor 3 counts the number M of oscillation periods of the clock circuit 4 in a time interval between two adjacent zero crossing points of the utility power AC input, and finally the microprocessor 3 compares the counted number with a minimum threshold value M0 and a maximum threshold value M1 whereby determining whether the clock precision of the microprocessor 3 meets a precision requirement. In this embodiment, the utility power AC input is a sine wave signal with a frequency of 50 Hz and a wave period of 0.02 s, and a time interval between two adjacent zero crossing points of the utility power AC input is 0.01 s.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A clock detecting circuit, comprising:
   a microprocessor;
   a clock circuit; and
   a zero-cross detecting circuit;
   wherein:
   said clock circuit is connected to said microprocessor;
   an input end of said zero-cross detecting circuit is connected to a utility power AC input;
   an output end of said zero-cross detecting circuit is connected to an input end of said microprocessor;
   said zero-cross detecting circuit operates to detect a plurality of zero crossing points of the utility power AC input;
   said microprocessor operates to count a number of oscillation periods of said clock circuit in a time interval between two adjacent zero crossing points of the utility power AC input; and
   said microprocessor compares the number of oscillation periods with a minimum threshold value and a maximum threshold value, and
   (a) if the number of oscillation periods is smaller than the maximum threshold value and is greater than the minimum threshold value, said microprocessor determines that said microprocessor meets a precision requirement; and
   (b) if the number of oscillation periods is smaller than the minimum threshold value or is greater than the maximum threshold value, said microprocessor determines that said microprocessor does not meet the precision requirement.

2. The clock detecting circuit of claim 1, wherein said clock circuit is a crystal oscillating circuit.

3. The clock detecting circuit of claim 1, wherein said clock circuit is an oscillating circuit.

4. The clock detecting circuit of claim 1, wherein said microprocessor is a micro controller unit.

5. The clock detecting circuit of claim 1, wherein said microprocessor is a digital signal processor.

6. The clock detecting circuit of claim 1, further comprising a rectifying and voltage-stabilizing circuit.

7. The clock detecting circuit of claim 6, wherein an input end of said rectifying and voltage-stabilizing circuit is connected to the utility power AC input.

8. The clock detecting circuit of claim 6, wherein an output end of said rectifying and voltage-stabilizing circuit operates to supply power to said zero-cross detecting circuit.

9. A clock detecting circuit, comprising:
   a microprocessor;
   a clock circuit;
   a zero-cross detecting circuit; and
   a rectifying and voltage-stabilizing circuit;
   wherein:
   said clock circuit is a crystal oscillating circuit;
   said clock circuit is connected to said microprocessor;
   an input end of said zero-cross detecting circuit is connected to a utility power AC input;
   an output end of said zero-cross detecting circuit is connected to an input end of said microprocessor;
   said zero-cross detecting circuit operates to detect a plurality of zero crossing points of the utility power AC input;
   an input end of said rectifying and voltage-stabilizing circuit is connected to the utility power AC input;
   an output end of said rectifying and voltage-stabilizing circuit operates to supply power to said zero-cross detecting circuit;
   said microprocessor operates to count a number of oscillation periods of said clock circuit in a time interval between two adjacent zero crossing points of the utility power AC input; and
   said microprocessor compares the number of oscillation periods with a minimum threshold value and a maximum threshold value, and
   (a) if the number of oscillation periods is smaller than the maximum threshold value and is greater than the minimum threshold value, said microprocessor determines that said microprocessor meets a precision requirement; and
   (b) if the number of oscillation periods is smaller than the minimum threshold value or is greater than the maximum threshold value, said microprocessor determines that said microprocessor does not meet the precision requirement.

* * * * *